INVENTOR
JOHN A. LENTZ
BY Scott L. Norviel
ATTORNEY

Oct. 29, 1940.    J. A. LENTZ    2,219,559
APPARATUS FOR ORIENTING MODELS IN THE CONSTRUCTION OF DENTURES
Filed Aug. 21, 1937    2 Sheets-Sheet 2
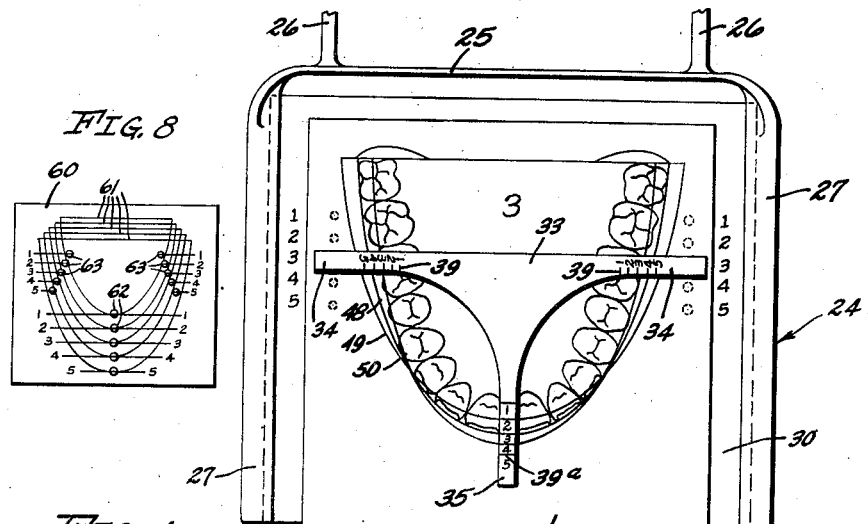
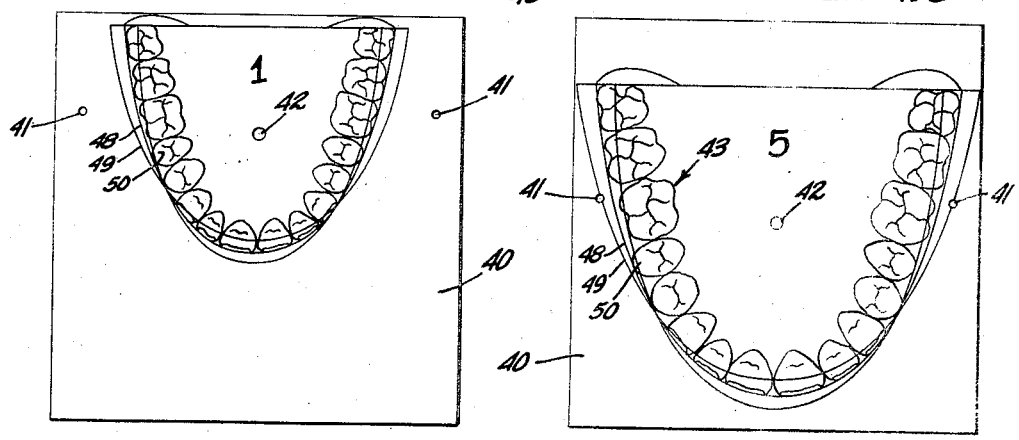
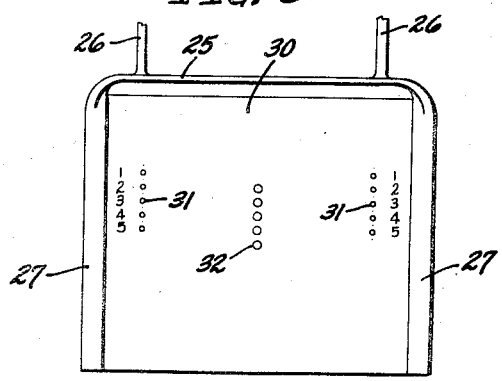
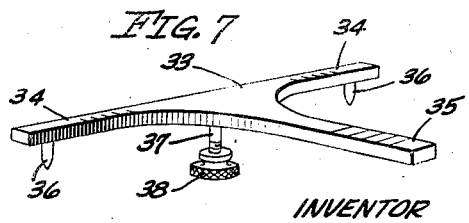
INVENTOR
JOHN A. LENTZ
BY Scott L. Norviel
ATTORNEY Patented Oct. 29, 1940

2,219,559

UNITED STATES PATENT OFFICE 2,219,559

APPARATUS FOR ORIENTING MODELS IN THE CONSTRUCTION OF DENTURES

John A. Lentz, Phoenix, Ariz.

Application August 21, 1937, Serial No. 160,241

6 Claims. (Cl. 32—32)

The term "model" used herein refers not only to a reproduction of a human jaw, with or without teeth in place, but also to a model having wax bite rims approximating in form the dentures to be made.

The term "articulator" used herein refers to any suitable device for holding models of jaws and controlling their relative positions and movements in the making of dentures.

The term "orient" used herein in connection with the term "model" means to define the antero-inferior relation of the models to the condyles, that is to correctly position a model in relation to an articulator preparatory to attachment of the model to the articulator and to set the condyle members to correct lateral positions either before or after attachment of models to articulator.

One of the most commonly used methods for making full dentures at present is as follows:

Impressions are taken of the upper and lower jaws in suitable impression material. From these impressions models are made from suitable model material such as plaster of Paris or the like. These models are replicas of the jaw to which dentures are to be fitted. Base plates of wax, or other suitable material, are then made to conform to the models, covering the area to be covered by the dentures and on these are built rims of wax conforming substantially to the space to be occupied by future teeth with some excess allowed for trimming. These rims are referred to as bite rims.

The base plates with bite rims attached are placed in the mouth and trimmed until in a normal rest position of the jaw, the upper and lower wax bite rims are in fair contact along their opposing or occlusal surfaces the buccal or labial surfaces of the bite rims showing the general position of the buccal and labial surfaces of the set of teeth, and the line of contact between the bite rims showing the occlusal plane of the posterior teeth.

One of the bite rims is now slightly softened by heat on its occlusal surface and the jaws brought together in a normal or centric position. While thus held several grooves are scratched from one bite rim across to the other thereby registering the correct relation of the bite rims in a manner that they may be returned to the same position after separation.

With the normal centric relation of the jaws thus established, first one model and then the other in centric relation to it, or both simultaneously are secured to the respective frames of an articulator, this step being referred to herein as the mounting of a model or of models.

While the relation of the models to each other is established by the centric bite, the orienting (that is the correct positioning) of the pair with reference to the opening axis or intercondylar axis of the articulator is, in the vast majority of cases, a matter of pure guess work. The only method heretofore used that has given reasonably accurate results has been by the use of an instrument known as a face-bow such as disclosed in U. S. Patent No. 629,531, issued July 25, 1899, to George B. Snow et al. By means of the face-bow, one model or the other is related to the condyles. After this model is fastened to the corresponding frame of the articulator, the other model is related to the model already mounted in a well known manner by the use of a centric bite and secured to the other frame of the articulator.

It is obvious that the accuracy of the face-bow method of orienting a model is contingent on the accuracy of a series of related steps and that time and individual skill are important factors in its success. Moreover, the difficulty of locating the exact desired points of the condyles and the great variations in condyles and glenoid fossae (in which condyles seat) and in the functioning of the temporo-mandibular joints formed by condyles and fossae, necessitates a considerable amount of guess work at best.

After the models are thus mounted in centric position in the articulator, the articulator is adjusted to hold this position and to any desired movements. Teeth are now selected for the case and as ordinarily done this is more or less haphazard and often repeated setups are necessary before the proper teeth are found to meet the requiremnts of size of the particular case.

The bite rims are now cut away part at a time and replaced by the artificial teeth, and the case finished in wax; the future denture being represented by teeth and wax.

The principal objects of my invention are: to provide an apparatus for automatically establishing the correct position of a given sized model in proportional relation to the intercondylar axis of an articulator to permit said model to be properly mounted on said articulator; an apparatus that will eliminate the use of a face-bow and the inaccuracies resulting therefrom; to provide means for readily classifying human arches as to size and to provide means for readily determining the lateral position of the condyle members of an articulator in correct proportional relation to the size of a model to be oriented for fixation to said articulator.

Other objects and advantages will be made manifest in the following description taken in connection with the accompanying drawings, in which:

Fig. 3 is a plan view looking in the direction of the arrow 3 of Fig. 2.

Figs. 4 and 5 are plan views of plates for use with the apparatus of my invention.

Fig. 6 is a plan view in reduced scale of a portion of the apparatus shown in Fig. 3.

Fig. 7 is a perspective view of an indicator shown in Figs. 1 and 3.

Fig. 8 is a plan view in reduced scale of a modified form of apparatus of my invention.

Figure 1:
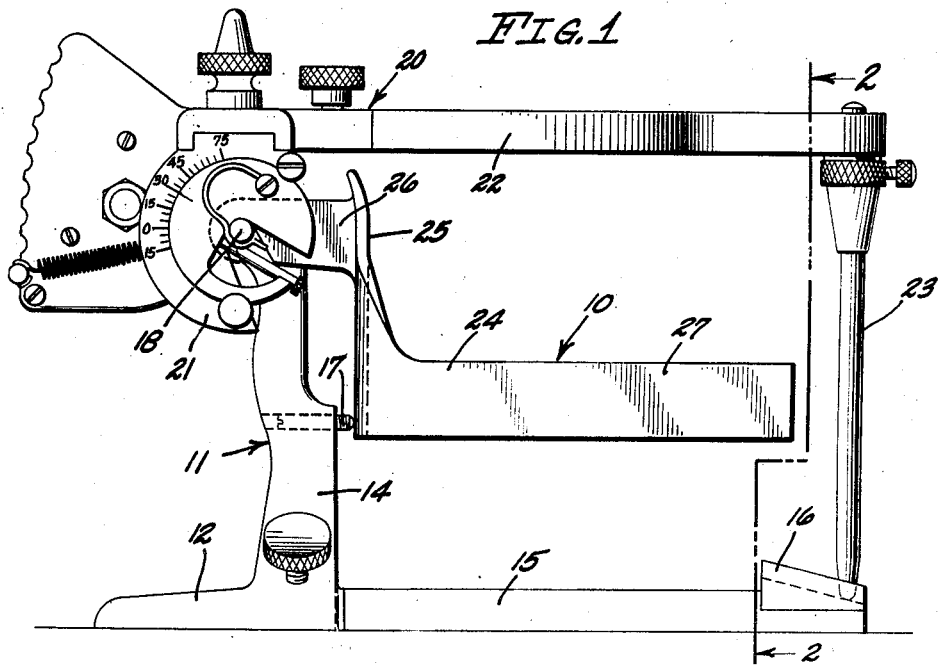
Fig. 1 is a side elevational view of a preferred embodiment of my invention mounted on an articulator.

Referring specifically to the drawings, a preferred form of apparatus 10 of my invention is shown in Fig. 1 as it appears when mounted on an articulator 11. The articulator includes a lower frame 12 having a pair of upstanding legs 14 and a lower model supporting plate 15, the latter having an incisal guide 16 mounted thereon. Threaded into the legs 14 are screws 17 for a purpose described hereinafter.

Figure 2:
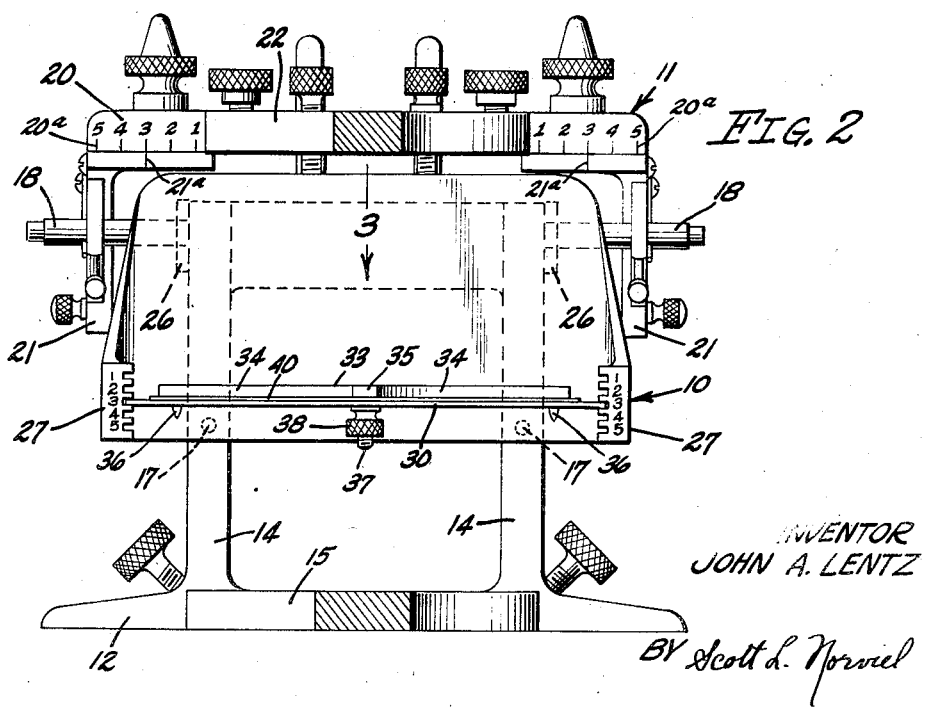
Fig. 2 is a vertical sectional view taken on the line 2—2 of Fig. 1.

Supported by the upper ends of the legs 14 is a condyle rod 18. Mounted above the lower frame 12 of the articulator 11 is an upper frame 20. Adjustable laterally on the frame 20 are condyle members 21, the latter resting on the condyle rod 18. Provided on each side of the frame 20 as seen in Fig. 2, is a series of marks 20a these being numbered from 1 to 5. Inscribed on the condyle heads 21 are single marks 21a for registration with the marks 20a for the purpose described hereinafter. Fixed to the upper frame 20 is an upper model supporting plate 22 having an incisal pin 23, the latter normally contacting the guide 16.

The apparatus 10 of my invention includes frame 24 having a back wall 25 to which a pair of hooks 26 are attached, the latter engaging the rod 18 adjacent the legs 14 as shown in Figs. 1 and 2. When the frame 24 is attached to the articulator 11 by engaging the hooks 26 with the condyle rod 18, the lower edge of the wall 25 rests against the screws 17 as seen in Fig. 1. The screws 17 are provided to permit adjusting the frame 24 into parallel relation with the upper frame 22 of the articulator. As long as the frame 24 remains in this parallel relation no further adjustment is made with the screws 17. Extending horizontally from the wall 25 is a pair of arms 27 formed to provide grooves 1, 2, 3, 4 and 5, the latter being indicated by the numerals provided on the ends of the arms 27, as shown in Fig. 2. Slidably received between the arms 27 is a plate 30 which may be placed in any one of the 5 pairs of grooves. As shown in Fig. 6 a row of holes 31 is provided at each side of the plate 30, each hole in each row being indicated by numerals 1 to 5. A center row of holes 32 is provided at the center of the plate 30. Removably mounted on the plate 30 is a T-shaped indicator 33 shown in Figs. 2, 3 and 7. The indicator 33 has lateral arms 34, a central arm 35 and pins 36 to fit into the holes 31 of the plate 30. Fixed centrally on the indicator 33 is a stud 37 having a nut 38 threaded thereon, the stud 37 being positioned to extend through one of the holes 32 to permit clamping the indicator to the plate 30 by tightening the nut 38. Inscribed on each of the arms 34 of the indicator 33 is a series of five lines 39 these being positioned to indicate the lateral position of the first molars in any of the five different sized models, a similar series of lines 39a on the arm 35 being provided to indicate the anterior-posterior positions of the incisors of the different sized models.

To facilitate orientation of a model a series of 5 prints 40 is provided for use with the apparatus of my invention. The prints 40, three of which are shown in Figs. 3, 4 and 5, are preferably made of transparent Celluloid having pairs of holes 41 and central holes 42. Printed on each of the prints 40 is a diagram 43 of an arch, each of the arches being of different sizes from the smallest shown in Fig. 4 to the largest shown in Fig. 5, thus 5 sizes of arches being identified by the numerals 1 to 5 printed on the prints. Printed on each of the diagrams 43 are lines 48, 49 and 50; the line 48 defines the periphery of the teeth as shown, the line 49 indicates a wider but shorter arch while the line 50 defines a narrower and longer arch. Each of the lines 48, 49 and 50 is substantially equal in length.

*Operation*

To orient a particular model for fixation to the articulator 11, assuming it to be a case with a sufficient number of teeth in place, the model is first classified as to size. This is done by placing one and then another of the Celluloid prints 40 over the model until the arch most nearly conforming to the size of the model is found. If the model is classified as size 3, for example, the plate 30 is positioned in the number 3 groove of the arms 27 as shown in Fig. 2. The print 40 bearing the number 3 arch diagram is placed on the plate 30 and properly positioned thereon by mounting the indicator 33, the pins 36 thereof being inserted through the number 3 holes of the rows 31. The selected print 40 and indicator 33 are secured on the plate 30 by tightening the nut 38 of the stud 37 against the underside of the plate 30. The condyle heads 21 are now fixed in position with the marks 21a in registration with the number 3 marks of the frame 20.

The model at hand is now superimposed on the indicator 33 with the disto-buccal cusps of the first molars and the mesio-incisal angles of the central incisors resting on the arms 34 and 35 respectively of the indicator 33, the sagittal planes of the model and articulator being as coincident as possible. The model is then ready for fixation to the upper frame 22 of the articulator. After the model is mounted to the frame 22, the frame 24 is removed from the articulator and the lower or opposing model is then related by use of a centric bite and mounted on the lower frame 15 of the articulator 11.

The use of the Celluloid prints 40 on the plate 30 may be dispensed with by using the lines 39 and 39a on the indicator 33 to locate the first molars and central incisors respectively, however, the complete arch on the print 40 somewhat facilitates the placing of the model.

For wider or narrower arches of the same length circumferentially the outlined narrower or wider arches indicated at 49 and 50 respectively are utilized. In full cases, the periphery of the aforementioned bite rims take the place of the periphery of the buccal and labial surfaces. When some of the teeth are present and some are missing, those left, with the help of wax judiciously placed at necessary places that are deficient, are usually sufficient to establish the three points of orientation with reasonable accuracy, which is all that is necessary.

After the model is properly oriented to the articulator and mounted thereon, the proper teeth are selected and set up on the model as aforedescribed.

Referring now to Fig. 8, I have shown therein a plate 60 equal in size to the aforedescribed plate 30. Provided on the plate 60 are outlines 61 of arches, these being substantially equal in size and shape to the arches appearing on the five aforedescribed prints 40.

The positions of the outlines 61 relative to the plate 60 are identical to the relative positions of the arches on the prints 40 and the plate 30 when the selected print 40 is properly related to the plate 30. Formed on the plate 60 at the foremost extremity of each of the outlines 61 is a raised area 62, similar raised areas 63 being provided in pairs for each of the outlines 61 at the approximate point of the disto-buccal cusps of the first molars. The areas 62 and pairs of areas 63 are identified by numerals 1 to 5 appearing on the plate 60 as shown.

The plate 60 may be substituted for the plate 30, prints 40 and indicator 33 in the following manner: A model to be mounted on the articulator 11 may be placed on the plate 60 and classified as to size by selecting one of the outlines 61 conforming to the approximate size of the model. If the model is size 3 for example, the plate 60 is positioned in the frame 24 in the number 3 grooves of the arms 27 and the model placed on the plate 60 with the disto-buccal cusps of the first molars resting as closely as possible on the number 3 areas of the elevated areas 63 while the mesio-incisal angles of the central incisors rest on the number 3 area of the elevated areas 62. The model may now be fixed to the upper frame 22 of the articulator in the manner aforedescribed.

It is obvious that the apparatus 10 of my invention provides a simple, easily operated means for orienting a model in correct proportional relation to the intercondylar axis of an articulator as well as providing means for obtaining the proportional lateral adjustment of the condyle members of an articulator.

Although I have shown and described but one preferred form of my invention it is understood that many modifications and changes might be made therein without departing from the spirit of the invention or the scope of the appended claims.

I claim as my invention:

1. In an apparatus for orienting dental models for mounting on an articulator, the combination of: a frame adapted to be positioned between the model frames of said articulator; a plate supported by said frame at any one of several definite, selective levels; a plurality of dental arch outlines provided on said plate, said outlines representing a series of small to large arches, the location of each arch outline relative to the condyle axis of said articulator being proportional to the size of said arch; and indicia on said plate indicating the size of each of said outlines, and the vertical position of said plate relative to said frame.

2. In an apparatus for orienting dental models for fixation to an articulator, the combination of; means for classifying said models as to size, comprising a series of indicia of graduated sizes of tooth arches with which to compare models in order to determine their size; means for supporting various sized models at definite selective levels relative to the intercondylar axis of the articulator; and means for supporting said classifying means on said supporting means whereby the correct antero-inferior position for mounting the model is clearly indicated, and the anatomical relation between the condyle axis and the tooth arch for a given size arch or model thereof is correctly determined and maintained.

3. In an apparatus for orienting dental models for mounting on an articulator the combination of: a frame adapted to be positioned between the model frames of said articulator; a plate supported by said frame at any one of a plurality of levels; an indicating member positioned on said plate at any one of a plurality of antero-posterior positions; and means for classifying a dental model as to size adapted to be positioned on said plate below said indicating member, the level of said plate and the position of said indicator being determined by the size of said model and being such that when said model is properly superimposed on said indicator the anatomical relation between the condyle axis and the tooth arch for a given sized arch or model thereof is correctly determined and maintained.

4. The combination, with an articulator having laterally adjustable condyle members of: a frame adapted to be positioned between the model frames of said articulator; a plate supported by said frame at any one of a plurality of levels; an indicating member positioned on said plate at any one of a plurality of antero-posterior positions; and means including a plate having a series of predetermined size marked dental arches for classifying a dental model as to size thereon adapted to be positioned on said plate beneath said indicating member, the level of said plate, the position of said indicator, and the lateral position of said condyle members being determined by the size of said model, and being such that when said model is properly superimposed on said indicator the anatomical relations between the condyle members and between the condyle axis and the tooth arch for a given size arch or model thereof is correctly determined and maintained.

5. The combination with an articulator having laterally adjustable condyle members of, a frame adapted to be positioned between the model frames of said articulator, a plate supported by said frame at any one of a plurality of levels, an indicating member positioned on said plate at any one of a plurality of antero posterior positions, said indicating member having indicia marked thereon for classifying a dental model as to size, the level of said plate, the position of said indicator and the lateral position of said condyle members being determined by the size of said model and being such that when said model is properly positioned on said indicator the anatomical relations between the condyle members and between the condyle axis and the tooth arch for a given sized arch or model thereof is correctly determined and maintained.

6. The combination with an articulator having laterally adjustable condyle members of a frame adapted to be positioned between the model frames of said articulator; a plate supported by said frame at any one of a plurality of predetermined levels, said plate having indicating means marked thereon for classifying a dental model as to size and determining the correct position thereon accordingly, the level of said plate, the position of the model on said plate and the lateral position of said condyle members being determined by the size of said model and being such that when said model is properly superimposed on the correct position on said plate the anatomical relations between the condyle members and between the condyle axis and the tooth arch of said model is correctly determined and maintained.

JOHN A. LENTZ.